United States Patent [19]

Bloot et al.

[11] 4,309,669
[45] Jan. 5, 1982

[54] GAS DISCHARGE LASER

[75] Inventors: Pieter C. Bloot; Johannes H. K. C. van Kleef, both of Eindhoven, Netherlands

[73] Assignee: U.S. Philips Corporation, New York, N.Y.

[21] Appl. No.: 34,523

[22] Filed: Apr. 30, 1979

[30] Foreign Application Priority Data

Feb. 12, 1979 [NL] Netherlands ............ 7901068

[51] Int. Cl.³ ............................................. H01S 3/08
[52] U.S. Cl. ............................................. 331/94.5 D
[58] Field of Search ............. 331/94.5 D, 94.5 E, 331/94.5 G; 350/310

[56] References Cited

FOREIGN PATENT DOCUMENTS 1436730 8/1973 United Kingdom .......... 331/94.5 G

Primary Examiner—Martin H. Edlow
Assistant Examiner—Léon Scott, Jr.
Attorney, Agent, or Firm—Bernard Franzblau

[57] ABSTRACT

A gas discharge laser includes a laser capillary in a tubular glass envelope which has at its two ends reflectors having optical axes which coincide with the axis of the laser capillary and which together constitute a laser resonator. A Brewster window is mounted in the envelope immediately before one of the reflectors. The Brewster window is placed in a holder manufactured from metal sheet material so that one side thereof is pressed against three regions of engagement on the holder whereby no mechanical stresses occur in the Brewster window. These stresses would otherwise disturb the polarizing effect of the Brewster window. This holder can be manufactured with small tolerances and in a very cheap manner.

13 Claims, 14 Drawing Figures

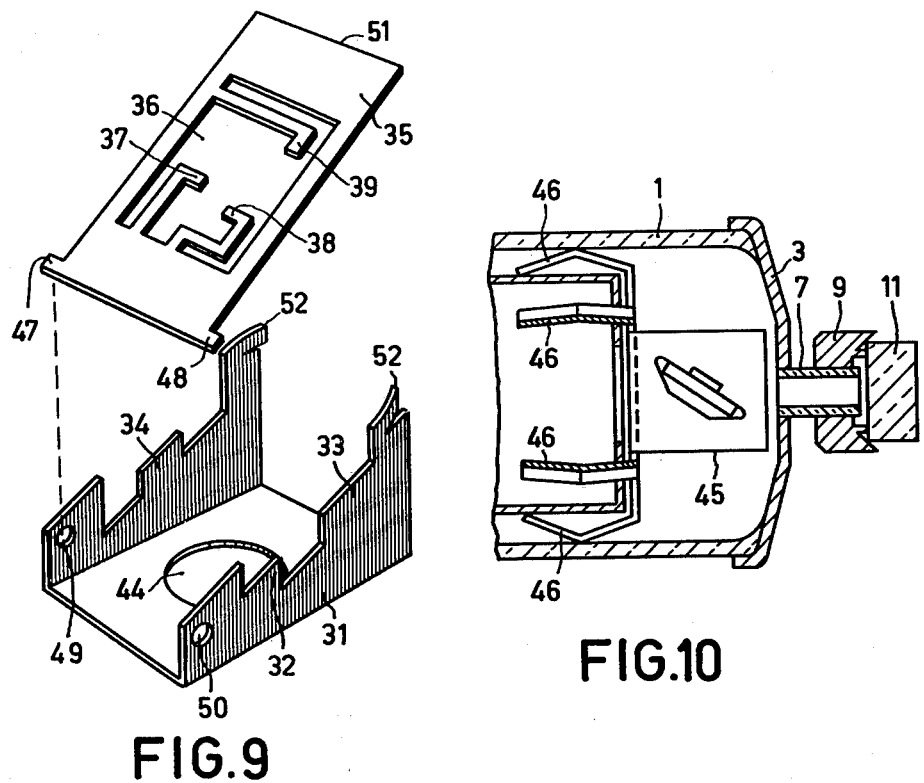
FIG.9
FIG.10
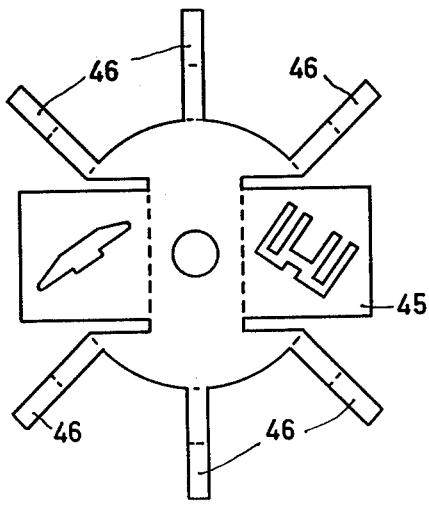
FIG.11

GAS DISCHARGE LASER

The invention relates to a gas discharge laser comprising a laser capillary located within a tubular glass envelope, which envelope comprises at its two ends reflectors having optical axes which coincide with the axis of the laser capillary and which reflectors together constitute the laser resonator, a Brewster window being mounted in said envelope immediately before one of the reflectors.

Such a gas discharge laser is known from German Patent Application No. 2,343,140 laid open to public inspection, which gas discharge laser comprises at one end of the laser capillary near one of the reflectors a wide bore in which a hollow cylinder is placed and against which a Brewster window is clamped to obtain a polarized laser beam. The reflectors of said laser also serve as a seal of the discharge space so that a simple laser forming one assembly is obtained. However, the provision of a wide bore in the laser capillary is very laborious and thus is not entirely suitable for mass production.

It is an object of the invention to provide a much simpler alternative for the connection of the Brewster window in a laser so that it remains possible nevertheless to very accurately position the Brewster window.

Another object of the invention is to provide a holder which produces substantially no mechanical stresses in the Brewster window.

A gas discharge laser of the kind mentioned in the opening paragraph is characterized according to the invention in that the Brewster window is placed in a holder which is manufactured from metal sheet material and in which one major surface of the Brewster window is resiliently urged against three regions of engagement on the holder.

A metal holder can be manufactured in a very simple manner from metal sheet material in which the desired apertures and incisions can be provided very accurately by means of known methods, such as etching, spark erosion, and the like. In this manner three accurately positioned points of engagement can be obtained in a simple manner. A first preferred embodiment of the invention is characterized in that the holder is manufactured from a metal strip and has a U-shape as a result of bending the ends of the strip. The Brewster window is clamped between the two limbs of the U-shaped holder, said limbs having two substantially elongate apertures in which a part of the edge of the Brewster window falls. At least one resilient strip extends into at least one of the elongate apertures and forces one side of the Brewster window against three points of engagement in the elongate aperture.

In this manner an accurate positioning of the Brewster window is obtained in a simple and cheap manner. If the part of the holder situated between the two limbs of the holder intersects the axis of the laser, it should be provided with an aperture for passing the generated laser beam.

A second preferred embodiment of the invention is characterized in that the holder consists of two portions, a U-shaped base portion having the three points of engagement against which one side of the Brewster window engages and a clamping portion which is clamped to the base portion and has an aperture in which a few resilient lugs extend which press against the other side of the Brewster window so that one side of the Brewster window is forced against the points of engagement.

Preferably three resilient lugs extend into the aperture in the clamping portion, which lugs exert pressure on the Brewster window opposite to the points of engagement because in that case no mechanical stresses are caused in the Brewster window. Mechanical stresses result in a disturbance of the preferential polarization of the Brewster window. The holder may be secured to the end plate of the gas discharge laser. However, it is alternatively possible to secure the holder to the cathode situated coaxially in the envelope or to the laser capillary.

A preferred embodiment of a gas discharge laser in which the holder is connected to the cathode is characterized in that a few centering springs extend from the holder in the direction of the inner wall of the envelope, said centering springs forming one assembly with the holder.

The invention will be described in greater detail, by way of example, with reference to the accompanying drawing, in which:

FIG. 1 is a longitudinal sectional view of a gas discharge laser according to the invention, FIG. 2 is a partial longitudinal sectional view of the laser shown in FIG. 1, FIG. 3 is a partial longitudinal sectional view of a laser according to the invention in which the holder is secured to the cathode, FIG. 4 is a developed view of a possible embodiment of a holder for the Brewster window, FIG. 5 is a perspective view of a Brewster window holder in a broken-away end of a gas discharge laser according to the invention, FIG. 6 is a perspective view of a second possible embodiment of a holder, FIGS. 7 and 8 are developed views of the holder shown in FIG. 6, FIG. 9 shows a modified embodiment of the holder shown in FIG. 6, FIG. 10 is a sectional view of a holder secured to the cathode and forming one assembly with the centering springs of the cathode, FIG. 11 is a developed view of a holder with centering springs shown in FIG. 10, FIGS. 12a and b are a longitudinal sectional view and an elevation, respectively, of a holder of the kind shown in FIG. 4 secured to the laser capillary, and FIG. 13 is a developed view of the holder shown in FIGS. 12a and 12b.

FIG. 1 is a longitudinal sectional view of a He-Ne gas discharge laser according to the invention. This laser comprises a glass envelope 1 which is partly sealed at its two ends by means of metal plates 2 and 3 each having central apertures 4 and 5, respectively. Metal tubular supports 6 and 7 to which the reflector holders 8 and 9 are secured extend from the central apertures. Multilayer reflectors 10 and 11, which together with the laser capillary 12 constitute the laser resonator, are secured to said reflector holders. As described in the aforesaid German patent application, one of said reflectors may be partially transmissive to laser light so as to provide an output from the laser. Furthermore a cylindrical cathode 13 is provided in the envelope of the laser and extends coaxially in the envelope. Metal plate 2 serves as an anode. In order to obtain polarized light from the laser, a Brewster window 14, located in a holder 15 according to the invention, is provided near the reflector 11. The shape of the holder will be described in greater detail with reference to the following figures.

FIG. 2 is a longitudinal sectional view of a part of the gas discharge laser shown in FIG. 1. The holder 15 is U-shaped and has two limbs 16 and 17 which have been obtained by bending the ends of a metal strip, and includes a connection part 18 therebetween. The Brewster window 14 is clamped between the limbs 16 and 17. The connection part 18 is secured against the metal plate 3.

FIG. 3 is a longitudinal sectional view of a part of a laser according to the invention in which the U-shaped holder is secured to the cathode 13 by means of the strips 19.

FIG. 4 is a developed view of a holder as shown with reference to FIGS. 1 and 2. The holder is manufactured from 1 mm thick resilient steel sheet (for example from N 939 steel). The aperture 22 has resilient strips 23, 24 and 25 extending into the aperture and a point of engagement 26. Aperture 27 has two inclined sides 28 and two points of engagement 29 and 30. The resilient strips 23 and 24 and the inclined sides 28 force one side of the Brewster window unambiguously against the three points of engagement 26, 29 and 30. In this manner a very accurate positioning is obtained without introducing stresses in the Brewster window. It will be obvious that the pressure strips and the points of engagement may also be constructed differently and may be present in other places in the apertures 22 and 27. The gist of the invention is that one side of the Brewster window is pressed against three points of engagement by means of resilient elements.

FIG. 5 is a perspective view of the holder shown in FIG. 4. The reference numerals of the various components correspond to those of the preceding figures.

FIG. 6 is a perspective view of a second embodiment of a holder for the Brewster window. This holder consists of a base portion 31 which is made from a metal strip, has the form of a U, and is provided with three points of engagement 32, 33 and 34 on which the Brewster window is placed. The Brewster window is forced against the points of engagement by means of a clamping portion 35 which is also in the form of a U and which has an aperture 36 in which resilient lugs 37, 38 and 39 extend. The bent portion 40 is hooked in the recesses 42 and the bent portion 41 is hooked in the recesses 43 of the base member 31. It will be obvious that the connection of the clamping portion to the base portion may also be done differently, for example, as is shown in FIG. 9. The Brewster window (not shown) is forced against the points of engagement 32, 33 and 34 by the resilient lugs which may be bent out of the plane of the clamping member. By causing said pressure to take place opposite to the points of engagement, no moments are exerted on the Brewster window so that even less deformation of the Brewster window occurs. It will be obvious that such a holder can be secured either to the metal plate 3 or to the cathode 13 (see FIG. 1). The aperture 44 passes the generated laser beam.

FIG. 7 is a developed view of the clamping portion 35 of FIG. 6 and FIG. 8 is a developed view of the base portion 31 of FIG. 6.

FIG. 9 is a perspective view of a modified embodiment of a holder as shown in FIG. 6. For clarity, components having the same functions are referred to by the same reference numerals as those used in FIG. 6. The clamping portion 35 has two projections 47 and 48 which fit into the apertures 49 and 50 in the base portion 31. The end 51 of the clamping portion 35 is locked behind inwardly bent strips 52 so that one side of the Brewster window is forced against the points of engagement 32, 33 and 34 by the resilient lugs 37, 38 and 39.

FIG. 10 shows how lugs extending from the holder 45 may be constructed as centering springs.

FIG. 11 shows how the centering springs 46 and the holder 45 can be manufactured from one piece of sheet material. The broken lines indicate where the metal is bent to form the shape shown in FIG. 10.

Figure 1:
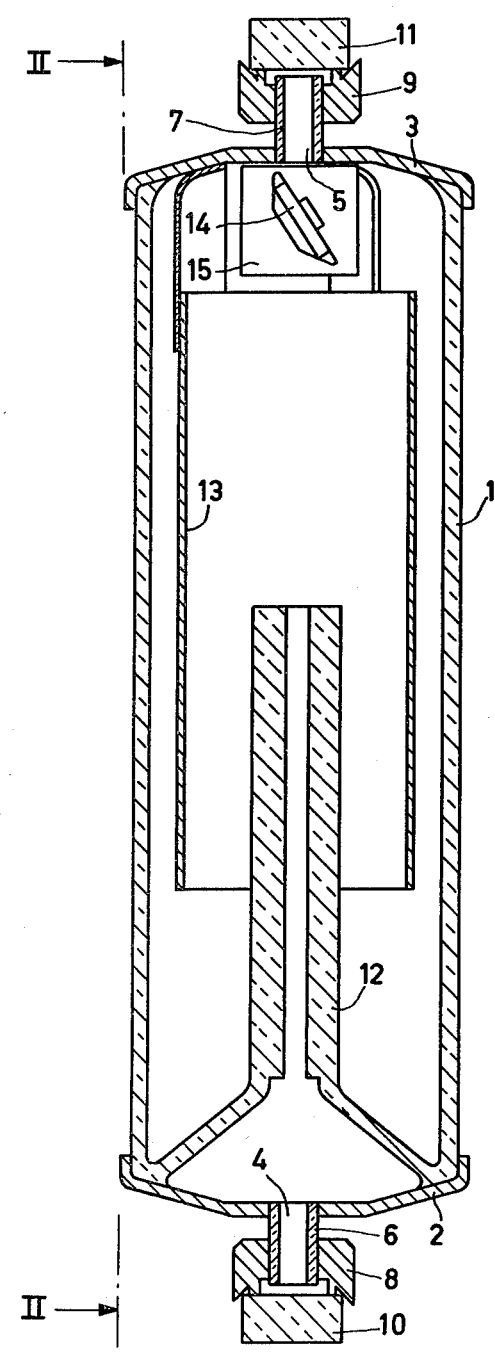
Figure 2:
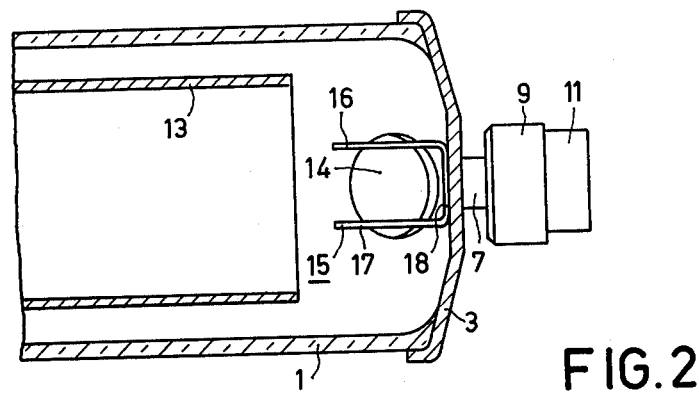
Figure 3:
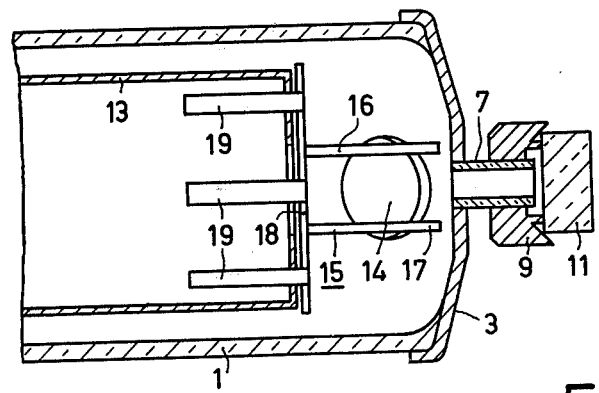
Figure 4:
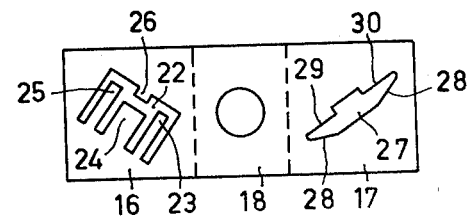
Figure 5:
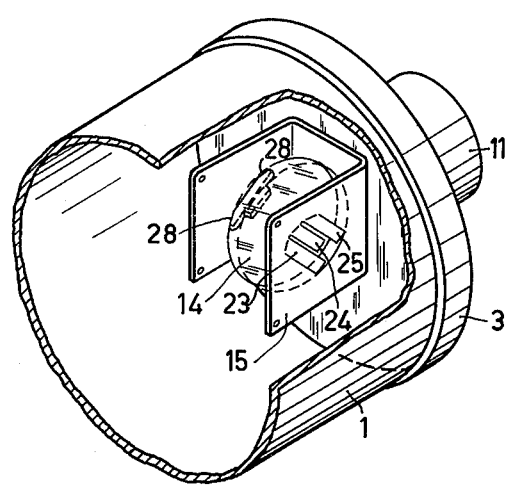
Figure 6:
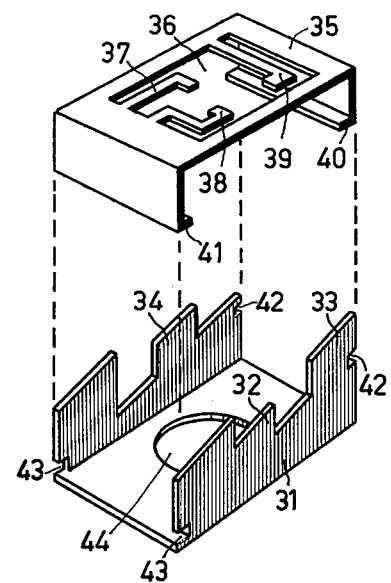
Figure 7:
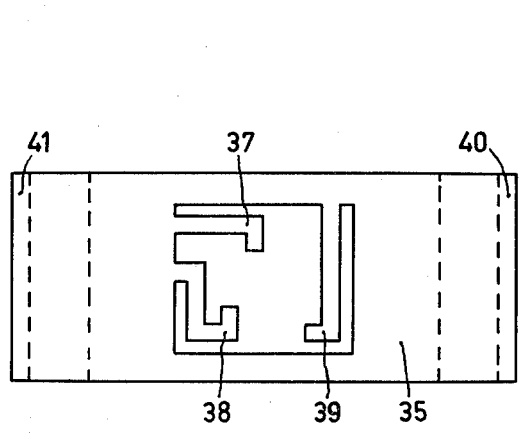
Figure 8:
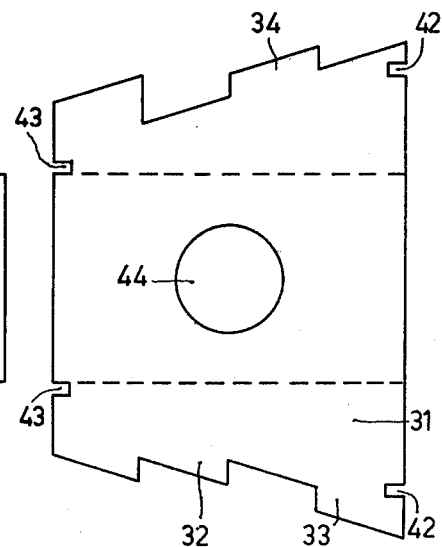
Figure 12:
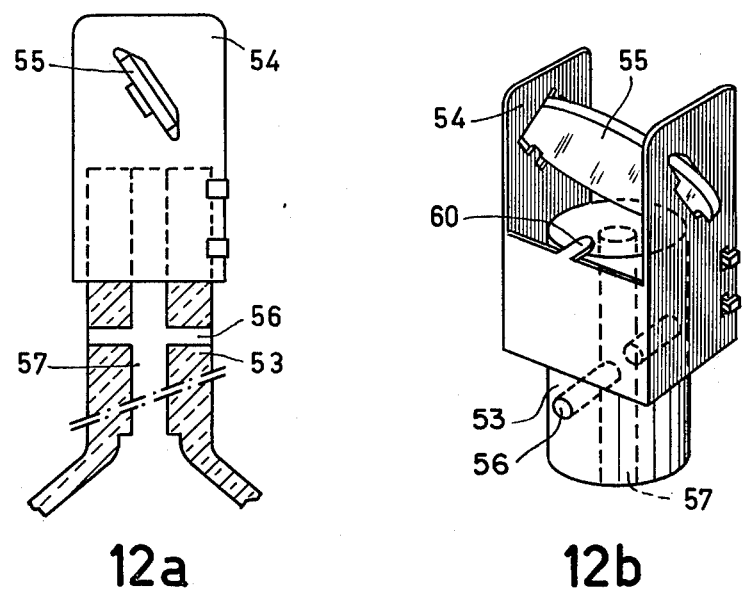

FIG. 12a is a longitudinal sectional view and FIG. 12b is an elevation of a holder 54 of the type shown in FIG. 4 secured to a laser capillary 53. The Brewster window 55 is provided opposite to the end of the discharge channel 57. Channel 56 is a transverse bore which is provided so as to prevent the discharge from occurring too close along the Brewster window 55.

Figure 13:
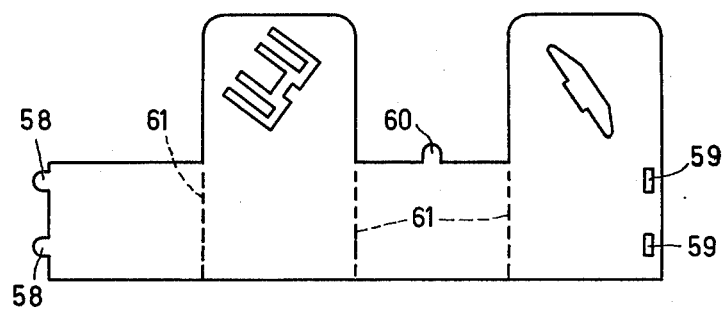

FIG. 13 is a developed view of a holder of the type shown in FIGS. 12a and 12b. The lugs 58 fit into the apertures 59. The lug 60 positions the holder in the axial direction relative to the laser capillary 53. The holder is folded along the broken lines 61.

What is claimed is:

1. A gas discharge laser comprising a tubular glass envelope containing a gas including an active lasing medium and a laser capillary having a longitudinal axis, which envelope comprises two electrodes for establishing an electric discharge in the gas and at each end a reflector having an optical axis, the optical axes of said reflectors being coincident with the axis of the laser capillary, said reflectors together with the laser capillary constituting a resonant cavity, a Brewster window mounted in a holder in said envelope located in front of one of the reflectors, the holder being made of metal sheet material formed so that one major surface of the Brewster window is resiliently urged against three regions of engagement on the holder.

2. A gas discharge laser as claimed in claim 1, wherein the holder comprises a metal strip bent into a U-shape to form two confronting limbs with each of said limbs having a substantially elongate aperture in which a respective part of the periphery of the Brewster window is located, and the holder includes at least one resilient strip extending into at least one of the elongate apertures so as to urge said major surface of the Brewster window against said three regions of engagement which are located in the elongate apertures thereby to clamp the Brewster window between the two limbs of the U-shaped holder.

3. A gas discharge laser as claimed in claim 1 wherein the holder includes a portion which extends perpendicularly to the axis of the laser capillary and which has an aperture to pass a laser beam.

4. A gas discharge laser as claimed in any one of the claims 1-3, wherein the metal holder is secured to a cathode situated coaxially in the tubular envelope.

5. A gas discharge laser as claimed in claim 4 wherein the holder includes a plurality of resilient centering strips which extend from the holder in the direction of the inner wall of the tubular envelope and form one assembly with the holder.

6. A gas discharge laser as claimed in claim 1 wherein the holder comprises a first U-shaped base member including the three regions of engagement and a second clamping member which is clamped to the base member and which has an aperture into which a plurality of resilient lugs extend so as to press against an opposite major surface of the Brewster window thereby to urge said one major surface of the Brewster window against the regions of engagement in said first member of the holder.

7. A gas discharge laser as claimed in claim 3 wherein said plurality of lugs comprise three resilient lugs extending into the aperture in the clamping member so that said lugs exert pressure on the Brewster window opposite to the regions of engagement in the first member.

8. A gas discharge laser as claimed in claim 1 wherein said holder and the Brewster window mounted therein are positioned external of the laser capillary and within said envelope and one of said reflectors is partially transmissive to a laser light beam.

9. A gas discharge laser comprising: an elongate envelope containing a gas with an active lasing medium, a laser capillary tube in said envelope having a longitudinal axis, at least two electrodes in the envelope to establish an electric discharge in said gas, first and second reflectors at opposite ends of the envelope each having an optical axis that coincides with the axis of the laser capillary tube to define therewith an optical resonator, a holder made of a resilient sheet metal mounted in front of one of said reflectors and having three non-contiguous regions of engagement, and a Brewster window mounted in said holder so that a part of one major surface thereof is resiliently urged against said three regions of engagement of the holder.

10. A gas discharge laser as claimed in claim 9 wherein said holder includes first and second confronting resilient limbs each having an aperture therein, one of said limbs having a resilient strip extending into the aperture therein and the aperture of the other limb including at least two of said regions of engagement, said Brewster window being mounted for support in said apertures with said resilient strip urging said part of said one major surface against the regions of engagement in the aperture of said other limb.

11. A gas discharge laser as claimed in claims 8, 9 or 10 wherein said holder includes a surface portion positioned orthogonal to the axis of the laser capillary tube and comprises a further aperture in said surface portion axially aligned with the axis of the laser capillary tube.

12. A gas discharge laser as claimed in claim 9 wherein said holder comprises a thin strip of metal formed into a U-shaped member with two confronting limbs and with each of said limbs having an aperture therein in which apertures said Brewster window is mounted for contact at said three regions of engagement, one of said limbs having a resilient strip extending into the aperture therein and arranged to resiliently urge the Brewster window against said regions of engagement.

13. A gas discharge laser as claimed in claim 9 wherein said holder comprises a first U-shaped thin metal member having two confronting surfaces each containing an aperture and with each aperture providing at least one of said regions of engagement, and a second thin clamping member having an aperture into which a resilient strip extends and wherein the second clamping member is secured to the first U-shaped member so that said Brewster window, which is positioned in the apertures of the U-shaped member, is resiliently urged against said regions of engagement in said apertures by said resilient strip of the second member.

* * * * *

UNITED STATES PATENT AND TRADEMARK OFFICE
CERTIFICATE OF CORRECTION

PATENT NO. : 4,309,669
DATED : January 5, 1982
INVENTOR(S) : PIETER C. BLOOT ET AL It is certified that error appears in the above—identified patent and that said Letters Patent is hereby corrected as shown below:

Column 4 line 50, renumber claim 3 as claim5; change "claim 1" to --any one of claims 1-4--

Column 4 line 54, renumber claim 4 as claim 6; line 55, change "1-3" to --1-4--

Column 4 line 57, renumber claim 5 as claim 7; change "4" to --6--

Column 4 line 62, renumber claim 6 as claim 3

Column 5 line 4, renumber claim 7 as claim 4

Column 6 line 6, renumber claim 11 as claim 13 lines 6-7, change "8,9 or 10" to --10,11 or 12--

Column 6 line 11, renumber claim 12 as claim 11

Column 6 line 21, renumber claim 13 as claim 12

Signed and Sealed this

Fifteenth Day of February 1983

[SEAL]

Attest:

GERALD J. MOSSINGHOFF

*Attesting Officer*  *Commissioner of Patents and Trademarks*